United States Patent [19]

Teramachi

[11] 4,420,193
[45] Dec. 13, 1983

[54] LINEAR BALL BEARING UNIT

[76] Inventor: Hiroshi Teramachi, 34-8, Higashi-Tamagawa 2-chome, Setagaya-ku, Tokyo, Japan, 158

[21] Appl. No.: 399,917

[22] Filed: Jul. 19, 1982

[30] Foreign Application Priority Data

Aug. 11, 1981 [JP] Japan ............................... 56-124821
Sep. 17, 1981 [JP] Japan ............................ 56-137076[U]

[51] Int. Cl.³ ............................................. F16C 29/06
[52] U.S. Cl. .................................................... 308/6 C
[58] Field of Search .............. 308/6 R, 6 A, 6 C, 3 A, 308/3 R

[56] References Cited

U.S. PATENT DOCUMENTS

| | | | |
|---|---|---|---|
| 3,751,121 | 8/1973 | Geffner | 308/6 C |
| 4,253,709 | 3/1981 | Teramachi | 308/6 C |
| 4,310,202 | 1/1982 | Teramachi | 308/6 C |
| 4,376,557 | 3/1983 | Teramachi | 308/6 C |

Primary Examiner—Stuart S. Levy
Assistant Examiner—David J. Werner
Attorney, Agent, or Firm—George B. Oujevolk

[57] ABSTRACT

A linear ball bearing assembly including a bearing block body formed by forging or by precision casting and having a central recess of generally trapezoidal cross-section. Skirts are formed on opposite sides with respect to the central recess and integrally formed retaining side covers made of an oil-impregnated thermosetting material, die cast alloy or oil-impregnated sintered metal, being subject neigher to thrust load nor lifting load (upward load) are inserted into the bearing block body from the opposite sides of the bearing block and fixed thereto, and a race bar is incorporated into the linear bearing.

5 Claims, 25 Drawing Figures

FIG. 25

LINEAR BALL BEARING UNIT

FIELD OF THE INVENTION

This invention relates to the improvement in a ball bearing block body and the retaining covers for guiding the ball bearing block body and the unloaded balls of a linear ball bearing used for the sliding guide ways of the table side of a machine tool or a machining center or for the part of carriers which performs a reciprocating motion with a heavy weight loaded thereon.

BACKGROUND OF THE INVENTION

Generally, the bearing body of a linear ball bearing is made by forming an axial generally trapezoidal recess in a rectangular steel block and then, by forming a symmetrical hook-shaped supporting part by cutting off the lower part of the trapezoidal recess in the shape of an equilateral triangle.

(Japanese Patent Laid-open No. 55-109820/1980).

Thus, the workpiece of the bearing body is made by forming a through hole of a particular shape in the central part of the steel block by turning and a turning process to cut of the lower part of the central part.

Therefore, degradation in profitability due to increased material cost owing to production of chips in the turning process, increased time for processing and increased cutting oil consumption are the factors of a high cost. Such a process is inefficient.

Retainers incorporated into the bearing body are made of steel plates in a necessary shape by press forming.

(Japanese Patent Laid-open No. 54-145837/1979)

In press-forming a steel plate into the retainer, axial slits are formed at necessary parts and relatively small tongues are formed for scooping up the balls so as to project in the front and the rear of the slits, therefore, substantial strength and a high wear resistance are required of the tongues.

Therefore, it is necessary to use a steel plate of a high toughness and to heat-treat the steel plate after the forming process.

SUMMARY OF THE INVENTION

An object of the present invention is to provide a linear ball bearing assembly including a bearing block body formed by forging or by precision casting and having a central recess of a generally trapezoidal cross section and skirts formed on opposite sides with respect to the central recess and integrally made retaining side covers formed of an oil impregnated thermosetting plastic material, die cast alloy or an oil impregnated sintered metal, being subject neither to thrust load nor to lifting load (upward load) and inserted into the bearing block body from the opposite sides of the bearing block and fixed thereto, and a race bar incorporated into the ball bearing.

Another object of the present invention is to provide a linear ball bearing unit having a linear ball bearing of a reduced total weight attained by the use of a thermosetting plastic material for the retaining side covers.

A further object of the present invention is to provide a linear ball bearing unit where it is possible to facilitate the degree of gap adjustment between the loaded balls and the grooves for loaded balls through the application of a preload to the bearing block body by fastening a plurality of fastening members disposed perpendicularly to the slits formed on one side of the bearing block body.

A still further object of the present invention is to provide a linear ball bearing unit of a high dust sealing capability, including right and left supporting members formed in a U-shaped cross section and firmly held by the bearing block body with the respective upper ends of the unloaded ball sides disposed opposite to each other so as to surround the supporting parts of the bearing block body.

A still further object of the present invention is to provided a linear ball bearing unit wherein supporting members are capable of supporting and guiding many unloaded balls, hence the need for right and left side plates is eliminated.

Yet another object of the present invention is to provide a linear ball bearing unit wherein the right and left supporting members are formed integrally with retaining covers and are capable of guiding many unloaded balls, hence the need for threaded holes and screws for fastening side plates is eliminated.

Generally speaking, the present invention contemplates a linear ball bearing assembly which includes a bearing block body, the workpiece of which is forged and having a central recess of a generally trapezoidal cross section and right and left skirts formed opposite to each other with respect to the central recess. The block body has four axial grooves of a radius of curvature substantially the same as the radius of that bearing balls. These axial grooves are for the loaded balls and are formed in the upper wall and lower hook-shaped supporting parts of the trapezoidal central recess. Axial holes for the unloaded balls are formed through the bearing block body in parallel to the grooves for loaded balls formed in the upper wall and grooves for the unloaded balls are formed on the back sides of supports for the lower hook-shaped parts of the inclined walls. Symmetrical retaining side covers are attached to the opposite ends of the bearing block body, and comprise a race bar of a generally X-shaped cross section having grooves for loaded balls of a radius of curvature substantially the same as the radius of the grooves formed in the upper surface, and, there are also similar grooves in the lower inclined surface of the right and left rails and incorporated into the bearing block body. Also, U-shaped grooves for converting the direction of movement of balls are formed in the retaining side covers at positions corresponding to the junctions of the grooves for loaded ball and the holes for unloaded balls and the junctions of the grooves for loaded balls and the grooves for unloaded balls in the horizontal members. Right and left inclined members and right and left supporting members are formed integrally on opposite sides with respect to the U-shaped grooves for converting the direction of movement of the balls so as to protrude outward, and, axial grooves for loaded balls capable of retaining the balls are formed between those members, the retaining side covers are inserted into the bearing block body from the opposite ends. The horizontal members are fixed to the upper wall of the bearing block body, and many balls are filled in the bearing block body and the retaining side covers to constitute the linear ball bearing.

Guide grooves are formed in the parts of the receiving members which have an inverted L-shape.

These and other objects, the features and the performance of the linear ball bearing unit of the present invention will be more apparent from the following detailed description taken in connection with the accompanying drawing.

DETAILED DESCRIPTION OF THE INVENTION

Detailed description of preferred embodiments of the present invention will be provided hereunder with reference to accompanying drawing.

A bearing block body is generally indicated at 10.

Figure 3:
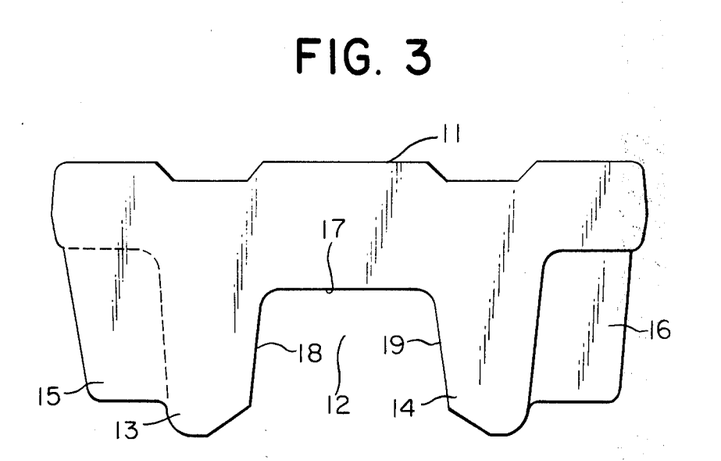
FIG. 3 is a front elevation of the workpiece of the bearing block body of a linear ball bearing in accordance with the present invention.
Figure 4:
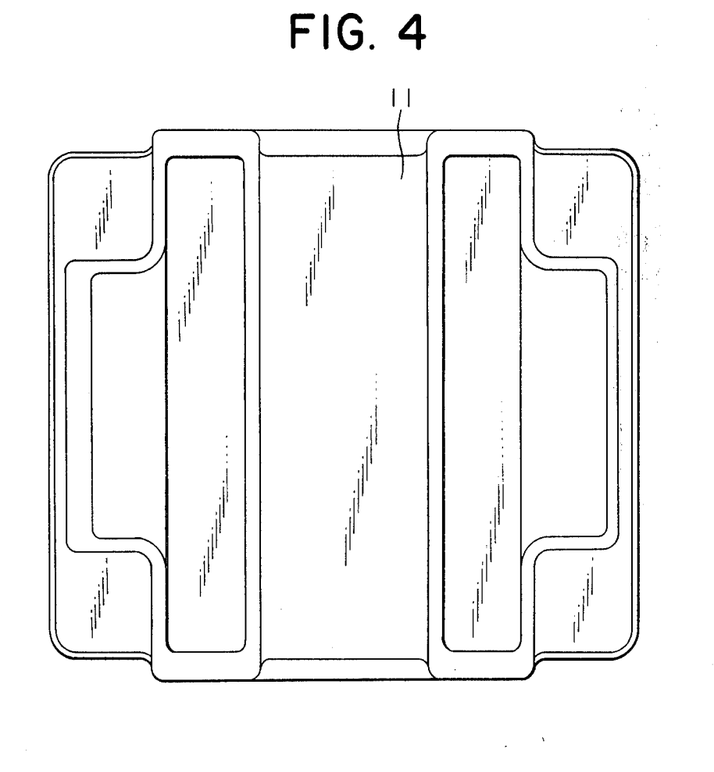
FIG. 4 is a plan view of the workpiece shown in FIG. 3.

In making the bearing block body 10, first a workpiece 11 of the bearing block body 10 is made by processing a steel material through forging or precision casting in a shape including, as shown in FIG. 3, a central recess 12 of a generally trapezoidal cross section and right and left skirts 13 and 14 and right and left protrusions 15 and 16 formed on opposite sides of the central recess in a single body.

Figure 5:
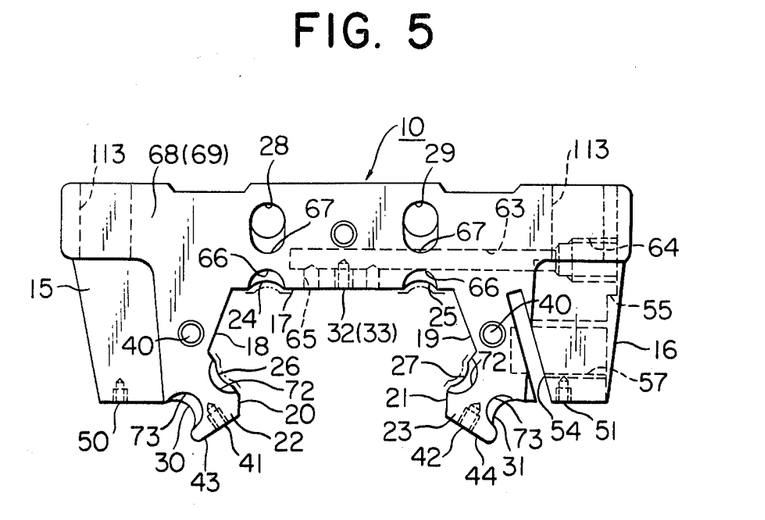
FIG. 5 is a front elevation of the bearing block body of a linear ball bearing in accordance with the present invention.

Then, the workpiece 11 of the bearing block body is subjected, for example, to turning and grinding processes to form an upper wall 17, and hook-shaped supporting parts 22 and 23 having right and left inclined walls 18 and 19 and right and left opening end surfaces 20 and 21 in the skirts 13 and 14, as shown in FIG. 5.

Then, axial grooves for loaded balls 24 and 25 of a radius of curvature substantially the same as the radius of the balls are formed along opposite sides of the upper wall 17 and axial grooves for loaded balls 26 and 27 are formed in the respective lower parts of the right and left inclined walls 18 and 19. Thus four grooves 24 to 27 for guiding the balls are formed symmetrically around the central recess 12 of the bearing block body.

Holes for unloaded balls formed in parallel to the grooves for loaded balls 24 and 25 formed in the upper wall 17 are indicated at 28 and 29. The holes 28 and 29 are formed through the bearing block body along the axial direction thereof in a size slightly greater than the size of the balls for allowing smooth rolling movement of the balls.

Grooves for unloaded balls 30 and 31 are formed in the backsides of the hook-shaped lower supporting parts 22 and 23 of the inclined walls 18 and 19 in parallel to the grooves for loaded balls 26 and 27. The grooves for loaded balls 26 and 27 extend axially of the bearing block body. Threaded holes 32 and 33 are formed at predetermined intervals substantially along the center of the upper wall 17 of the bearing block body 10. Retaining side covers 34 and 35 are inserted into the bearing block body 10 from the opposite ends thereof, respectively and are fixed thereto by screwing in screws 38 and 39 into the threaded holes 32 and 33.

When the retaining side covers 34 and 35 are inserted into the bearing block body 10 so that the respective end surfaces are in abutment with the end surfaces of the bearing block body 10. The horizontal members 36 and 37 are fixed to the bearing block body 10 by screws 38 and 39 in the threaded holes 32 and 33 through U-shaped recesses formed in the horizontal members 36 and 37 of the retaining side covers 34 and 35 (FIGS. 7 to 10).

Figure 1:
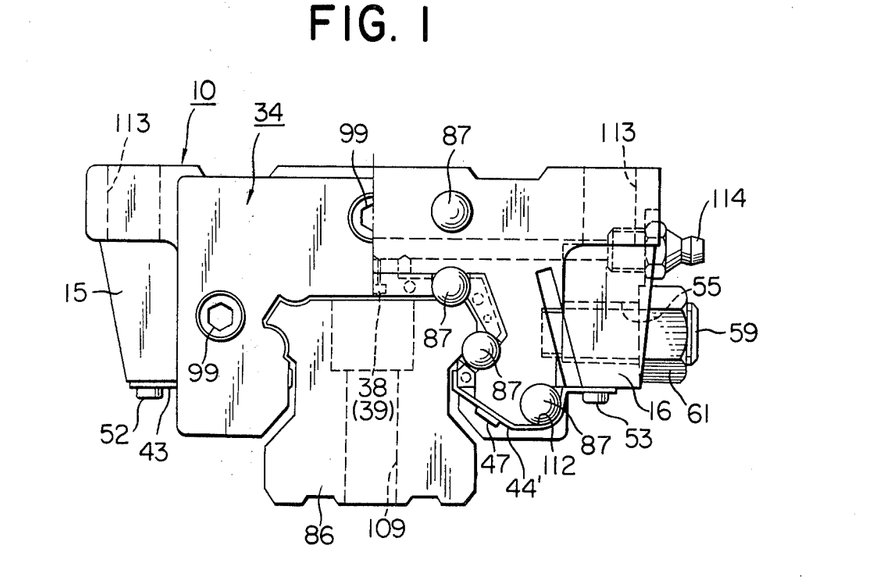
FIG. 1 is a front elevation partially cutaway view of a linear ball bearing unit assembly in accordance with the present invention.
Figure 2:
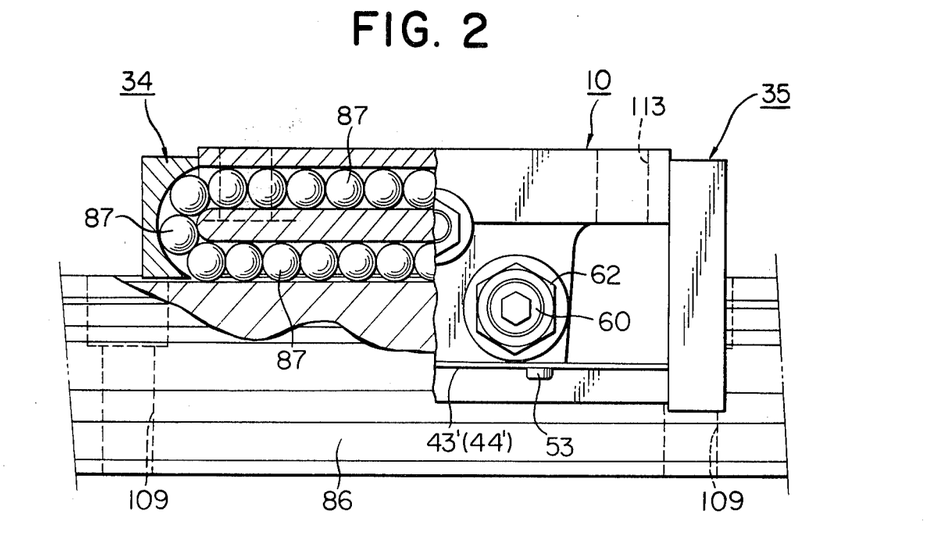
FIG. 2 is a side elevation partially sectional of a linear ball bearing unit assembly in accordance with the present invention.
Figure 13:
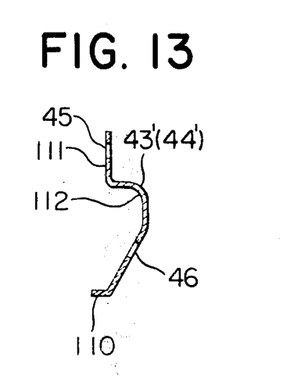
FIG. 13 is a sectional view taken along line A—A of FIG. 12.

Threaded holes for receiving screws for fixing the retaining side covers 34 and 35 are indicated at 40. Those threaded holes 40 are formed in the opposite end surfaces of the bearing block body 10. Threaded holes 41 and 42 are formed in the bottom walls 43 and 44 of the hook-shaped supporting parts 22 and 23 for receiving screws for attaching side plates to the hook-shaped supporting parts 22 and 23. The side plates 43' and 44' are attached to the bearing block body 10 by screws 47 in the threaded holes 41 and 42 through the through holes 46 and also by screws 52 and 53 in threaded holes 50 and 51 through through holes 45 formed in the rear flange part 111 of the side plates 43′ and 44′. Each of the side plates 43′ and 44′ is formed integrally of an inner flange part 110, an outer flange part 111 and an unloaded ball guiding part 112. The right and left receiving members 48 and 49 are fixedly received by the inner flange parts 110 (FIGS. 1 and 2 and FIG. 13).

Figure 6:
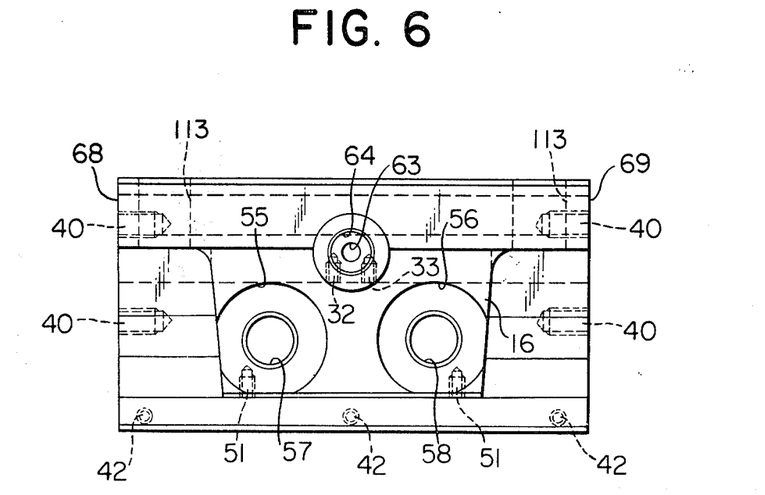
FIG. 6 is a side elevation of the bearing block body shown in FIG. 5.
Figure 7:
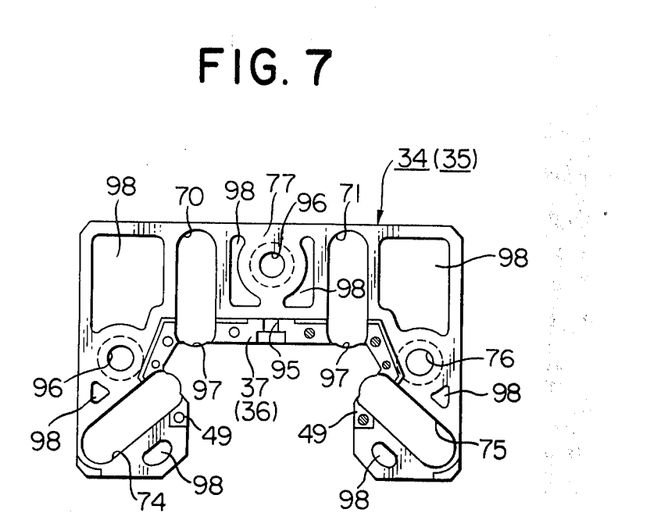
FIG. 7 is a front elevation of the retaining side cover of a linear ball bearing in accordance with the present invention.

As shown in FIG. 6, counterbores 55 and 56 are formed around threaded holes 57 and 58, respectively, along the axial direction of the bearing block body 10 in the protrusion 16 of the bearing block body 10.

A slit 54 is formed in the in the right-hand protrusion 16, in FIG. 5, of the bearing block body 10. The slit 54 is formed diagonally from the bottom end of the protrusion 16 toward the upper inner part of the protrusion 16.

The threaded holes 57 and 58 are formed across the slit 54.

When hexagon socket stop screws 59 and 60 are screwed into the threaded holes 57 and 58 and firmly tightened with hexagon nuts 61 and 62, the protrusion 16 is pressed and at the same time the skirt is flexed. Thus the gaps between the grooves for loaded balls of the bearing block body 10 and the loaded balls are adjusted.

A grease guide hole 63 formed in the bearing block body 10 extends from the right-hand side to the central part of the bearing block body 10. An internal thread 64 for receiving a grease nipple is formed in the outer end portion of the grease guide hole 63. Grease supply holes 65 are formed radially of the grease guide hole 63 in the central part of the upper wall 17 of the bearing block body 10 so as to communicate with the grease guide hole 63 (FIGS. 1 and 5).

Chamfers 66 and 67 for guiding balls are formed in the front and rear end surfaces 68 and 69 of the bearing block body 10 for facilitating the movement of the balls from the grooves for loaded balls 24 and 25 in the bearing block body 10 into the holes for unloaded balls 28 and 29 through U-shaped grooves 70 and 71 for inverting the direction of movement of the balls (FIG. 5). Chamfers 72 and 73 for guiding the balls are formed in the front and rear end surfaces of the hook-shaped supporting parts 22 and 23 for facilitating the movement of the balls from the grooves for loaded balls 26 and 27 formed in the hook-shaped supporting parts 22 and 23 into the grooves for unloaded balls 30 and 31 through the U-shaped grooves 74 and 75 formed in the retaining side covers 34 and 35 for inverting the direction of movement of the balls.

The U-shaped grooves 70 and 71 for inverting the direction of movement of the balls are formed in the retaining side covers 34 and 35 symmetrically with respect to the center line of the retaining side covers 34 and 35 and vertically at positions corresponding to the grooves for loaded balls 24 and 25 and the holes for unloaded balls 28 and 29, respectively, of the bearing block body 10. The U-shaped grooves 74 and 75 for inverting the direction of movement of the balls are formed in the right and left lower parts, respectively, of the retaining side covers 34 and 35 at positions corresponding to the grooves for loaded balls 26 and 27 formed in the hook-shaped parts 22 and 23 and the grooves for unloaded balls 30 and 31 (FIG. 5).

The horizontal members 36 and 37 of the retaining side covers 34 and 35 are integrally incorporated into the retaining side covers 34 and 35 between the U-shaped grooves 70 and 71 for inverting the direction of movement of the balls so as to protrude axially of the retaining side covers 34 and 35 from the end surfaces 77 of the side covers 36 and 37. Curved walls 78 and 79 of a radius of curvature substantially the same with the radius of the balls are formed in the side surfaces of the horizontal members 36 and 37.

Figure 8:
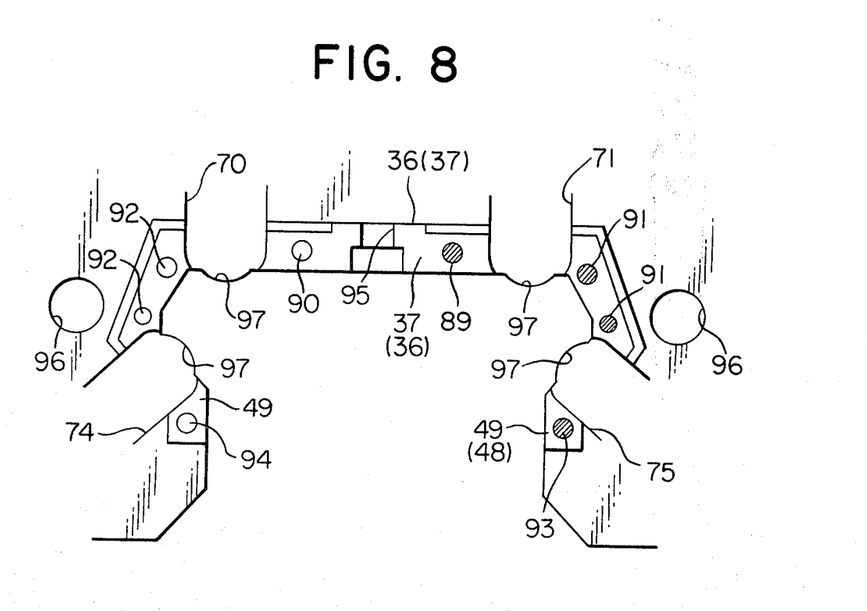
FIG. 8 is an enlarged front elevation of the retaining part of the retaining side cover shown in FIG. 7.
Figure 9:
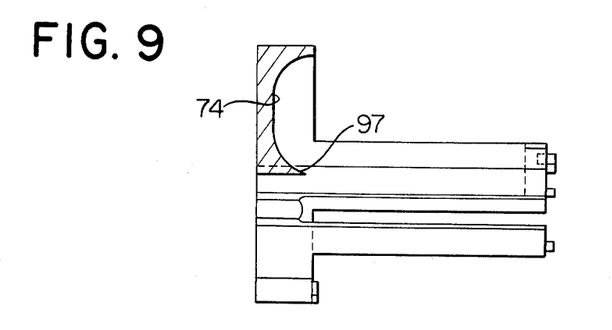
FIG. 9 is a sectional view taken along line A—A of FIG. 7.
Figure 10:
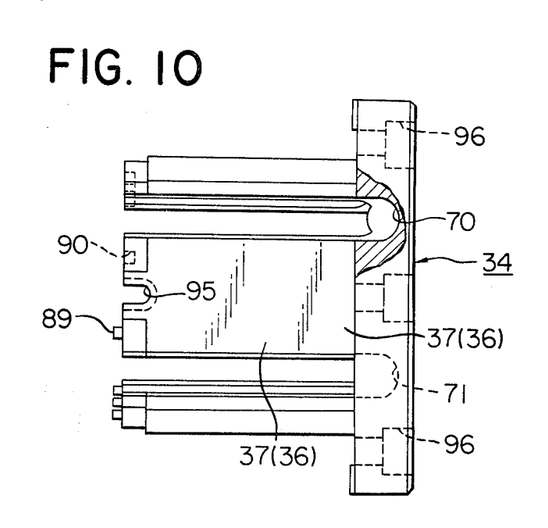
FIG. 10 is a plan view of the retaining side cover of FIG. 7.
Figure 11:
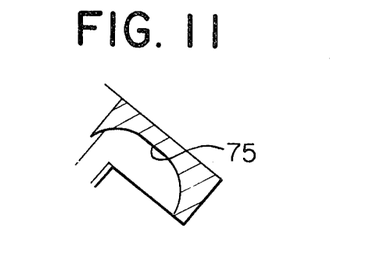
FIG. 11 is a sectional view taken along line B—B of FIG. 7.
Figure 12:
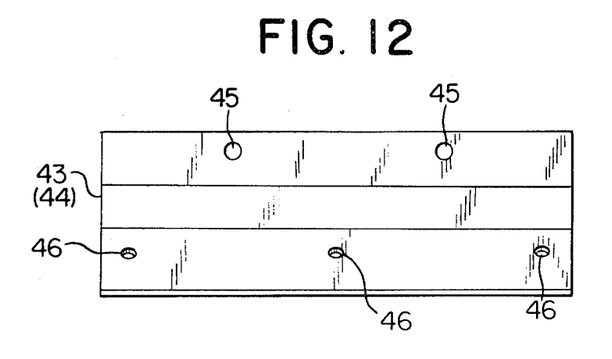
FIG. 12 is a front elevation of the side plate of a linear ball bearing unit in accordance with the present invention.

Tongues 97 are formed in the retaining side covers 34 and 35 on the respective sides thereof in which the U-shaped grooves 70, 71, 74 and 75 for inverting the direction of movement of the balls are disposed opposite the grooves for loaded balls 24 to 27 formed in the bearing block body 10 (FIGS. 2 and 8).

The tongues 97 serve to allow the balls 87 to move smoothly from the grooves for loaded balls into the U-shaped grooves or from the U-shaped grooves into the grooves for loaded balls.

The right and left inclined members 80 and 81 of the retaining side covers 34 and 35 are formed so as to protrude axially from the end surfaces 77 of the retaining side covers 34 and 35. The width of the inclined outer surfaces 83 of the inclined members 80 and 81 is substantially the same with the width of the inclined walls 18 and 19 of the bearing block body, while the upper and lower inner curved surfaces 84 and 85 thereof and the outer curved surfaces 78 and 79 formed in the horizontal members 36 and 37 are symmetrical with each other. The radius of curvature of the upper and lower inner curved surfaces 84 and 85 is designed so that the balls 87 are prevented from falling off when a race bar 86, which will be described afterward, is removed.

Figure 15:
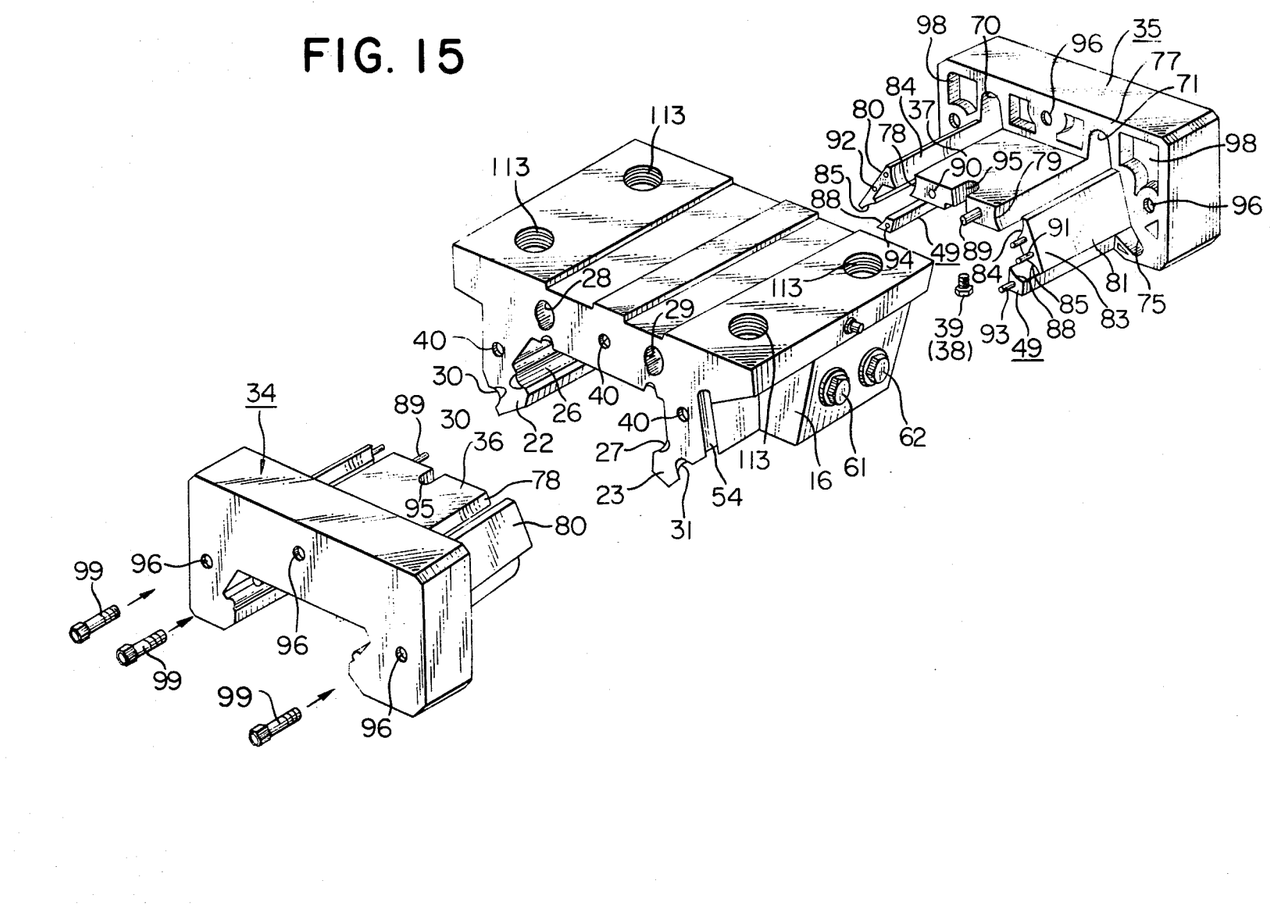
FIG. 15 is an exploded view in perspective of a linear ball bearing unit in accordance with the present invention, in which the race bar is removed.
Figure 16:
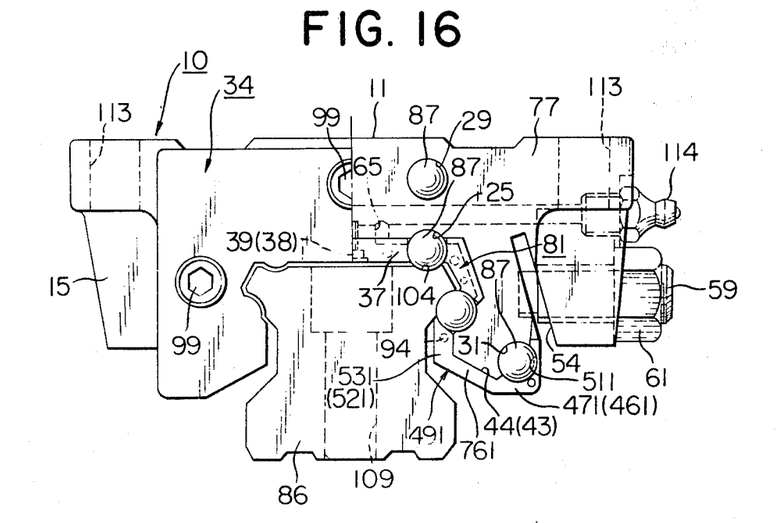
FIG. 16 is a front elevation partially cutaway of another embodiment of a linear ball bearing unit in accordance with the present invention.
Figure 17:
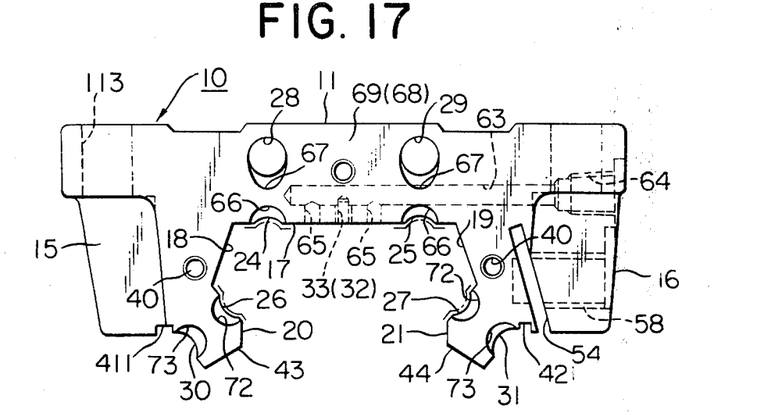
FIG. 17 is a front elevation of the bearing block body of a linear ball bearing in accordance with the present invention.
Figure 18:
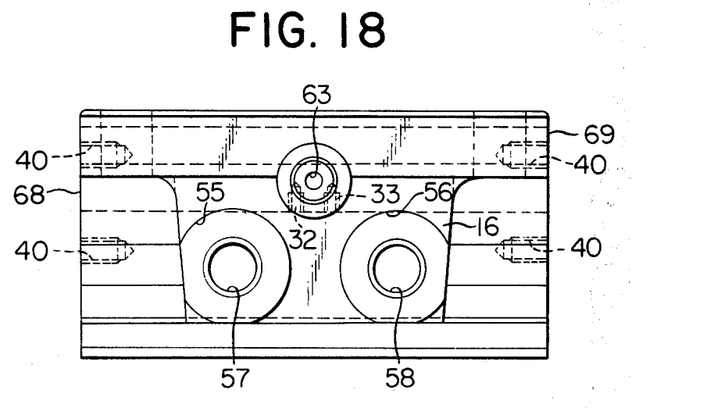
FIG. 18 is a side elevation of the bearing block body shown in FIG. 5.
Figure 19:
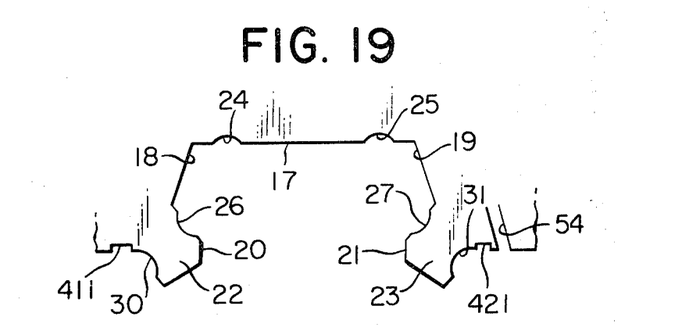
FIG. 19 is an enlarged front elevation of the bearing block body shown in FIG. 5.

The right and left receiving members 48 and 49 of the retaining side covers 34 and 35 are formed so as to protrude axially from the end surfaces 77 of the retaining side covers 34 and 35, similarly to the right and left inclined members 80 and 81 and the inner curved surfaces 88 and the lower curved surfaces 85 of the right and left inclined members 80 and 81 are symmetrical with each other. The radius of curvature of the inner curved surfaces 88 is designed so that the balls 87 are prevented from falling off when the race bar is removed. Retaining pins 89 are formed in the horizontal members 36 and 37 so as to project toward the end surfaces of the bearing block body 10. Holes 90 for receiving the retaining pins 89 are formed at positions corresponding to the retaining pins 89 (FIG. 15).

Retaining pins 91 project from the extremities of the left inclined members, facing the corresponding end surfaces of the bearing block body 10. Holes 92 are formed in the right inclined members 80 correspondingly to the retaining pins 91.

Retaining pins 93 project from the extremities of the left receiving members 49, facing the end surfaces of the bearing block body 10. Holes 94 for receiving the retaining pins 93 are formed in the right receiving members 48 correspondingly to the retaining pins 93.

The retaining side covers 34 and 35 are fixed to the bearing block body 10 by screwing bolts 99 into threaded holes 40 formed in the opposite end surfaces of the bearing block body through holes 96.

Cavities 98 are formed in the side cover parts of the retaining side covers 34 and 35 for saving material without reducing the mechanical strength of the retaining side covers 34 and 35.

Figure 14:
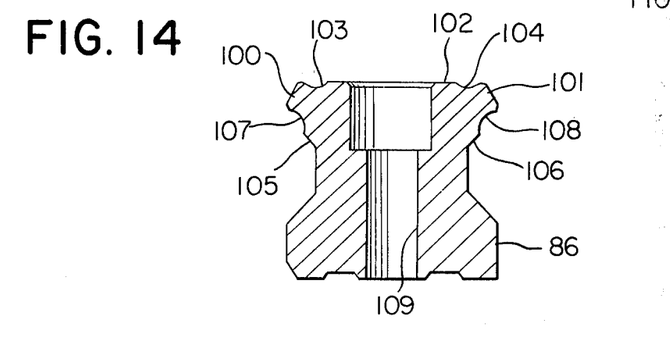
FIG. 14 is a cross sectional view of a race bar to be incorporated into a linear ball bearing in accordance with the present invention.

The race bar 86 has upper right-hand and upper left-hand axial ribs 100 and 101. Grooves for loaded balls 103 and 104 of a radius of curvature substantially the same with the radius of the balls are formed in the upper surfaces 102 of the ribs 100 and 101 at positions corresponding to the grooves for loaded balls 24 and 25 formed in the bearing block body 10, while grooves for loaded balls 107 and 108 a radius of curvature substantially the same with the radius of the balls are formed in the lower inclined surfaces 105 and 106 of the ribs 100 and 101 at positions corresponding to the grooves for loaded balls 26 and 27.

Reference numeral 109 designates a hole used for attaching the race bar to the movable part or the stationary part of a machine tool or the like. Threaded holes 113 are formed in the bearing block body 10 at necessary positions and are used for attaching a movable member of a machine tool, an industrial machine or a business machine to the bearing block body 10.

The process of assembling the parts of a linear ball bearing unit in accordance with the present invention thus constituted will be described in assembling order.

First the retaining side cover 34 is inserted into the bearing block body 10 and fastened thereto by means of the bolts 99, then the horizontal member 36 is fastened to the upper wall 17 of the bearing block body 10 by means of screws 38.

Then, the side plates 43' and 44' are attached to the bottom walls 43 and 44 of the hook-shaped supporting parts 22 and 23 by means of screws 47 with the inner flanges 110 of the side plates firmly holding the right and left receiving members 48 of the retaining side cover 34. The outer flanges 111 of the side plates 43' and 44' are fastened to the protrusion 15 of the bearing block body 10 by means of screws 53.

Then, many balls 78 are filled in the grooves for unloaded balls 28 and 29 of the bearing block body 10, the spaces between the ball guides for unloaded balls 112 and the grooves for unloaded balls 30 and 31, and the U-shaped grooves 70, 71, 74 and 75 for inverting the direction of movement of the balls formed in the retaining side cover 34.

Then, after filling the balls 87 in the other retaining side cover 35, the retaining side cover 35 is inserted into the bearing block body 10 so that the U-shaped recess 95 receives the previously loosely screwed in the upper wall 17 of the bearing block body 10 and the retaining pins 89, 91 and 93 projecting from the front end of the horizontal member of the retaining side cover 35 fit in the corresponding holes 90, 92 and 94 of the retaining side cover 34 which has previously been inserted into the bearing block body 10.

Then, the retaining side covers 34 and 35 are firmly fastened to the bearing block body 10 by means of bolts 99 inserted through the holes 96.

Since the linear ball bearing unit of the present invention is constituted as described hereinbefore, the loaded balls moving in the passages between the grooves for loaded balls formed in the bearing block body and the grooves for loaded balls formed in the race bar 86 are smoothly scooped up and guided into the holes for unloaded balls 28 and 29 and the grooves for unloaded balls 30 and 31 of the bearing block body, because the retaining side covers, which guide the loaded balls moving in the passages formed between the grooves for loaded balls of the bearing block body 10 and the grooves for loaded balls of the race bar 86 into the U-shaped grooves 70, 71, 74 and 75 for inverting the direction of movement of the balls, have large supporting areas and have grooves formed so as to scoop the loaded balls continuously, when the linear ball bearing and the race bar 86 are assembled and the linear ball bearing is moved back and forth along the race bar 86.

Another embodiment of the present invention will be described hereunder with reference to FIGS. 16 to 25. In the following description, like numerals designate parts which are like or similar to those shown in FIGS. 1 to 15 and the description thereof will be omitted, whereas only different parts will be described.

Reference numerals 411 and 421 designate grooves formed in paralell to grooves for unloaded balls 30 and 31 formed in the backside surfaces of hook-shaped supporting parts 22 and 23.

Figure 20:
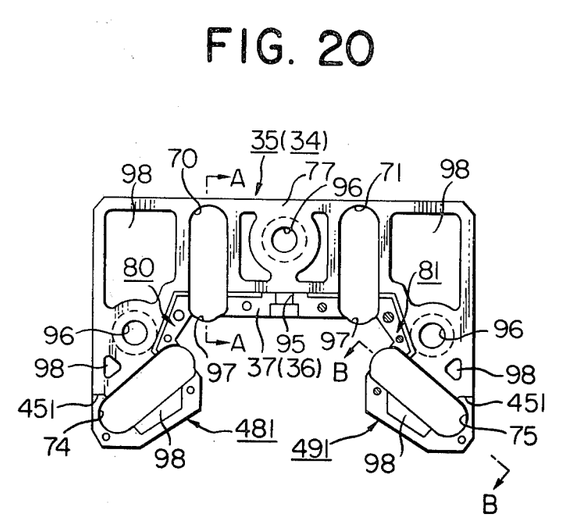
FIG. 20 is a front elevation of the retaining side covers of a linear ball bearing in accordance with the present invention.
Figure 21:
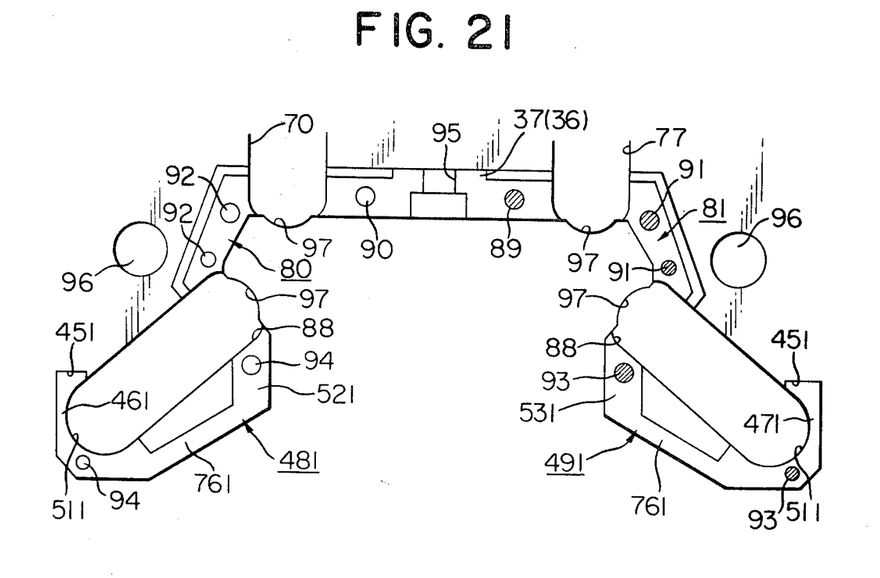
FIG. 21 is an enlarged front elevation of the retaining part of the retaining side cover shown in FIG. 8.
Figure 22:
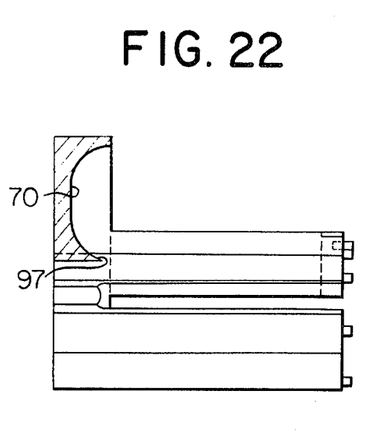
FIG. 22 is a sectional view taken along line A—A of FIG. 8.
Figure 23:
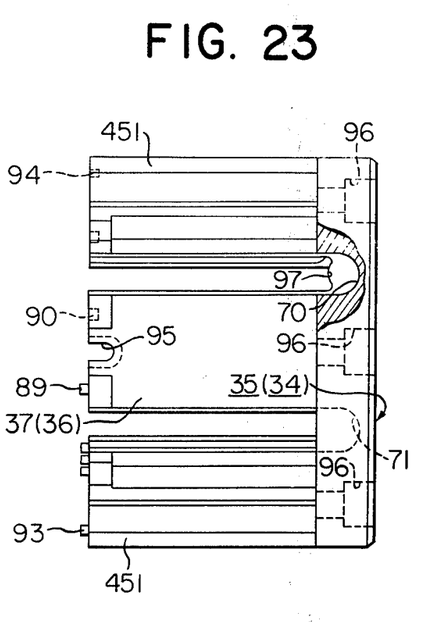
FIG. 23 is a plan view of the retaining side cover shown in FIG. 8.
Figure 24:
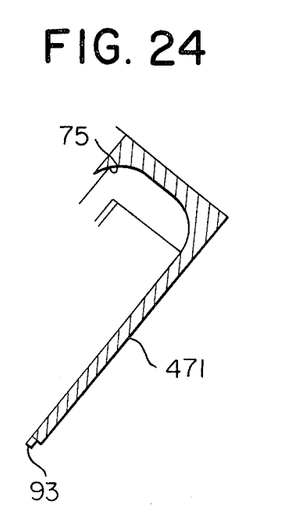
FIG. 24 is a sectional view taken along line B—B of FIG. 8.
Figure 25:
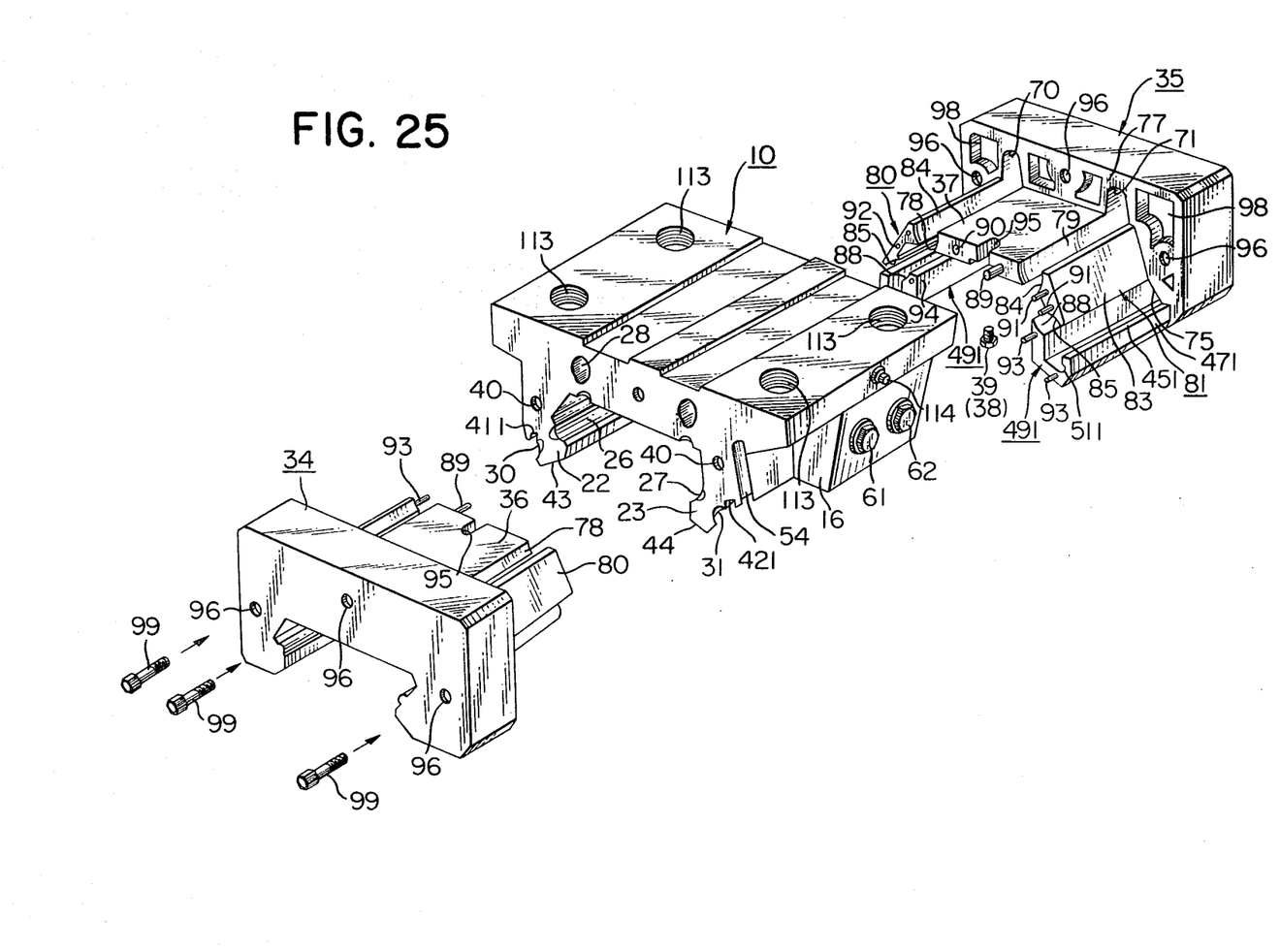
FIG. 25 is an exploded view in perspective of a linear ball bearing unit in accordance with the present invention, in which the race bar is removed.

The upper endges 451 of the right and left receiving members 481 and 491 of a generally U-shaped cross section of retaining side covers 34 and 35 are fixedly received in the grooves 411 and 421 (FIG. 20).

As shown in FIGS. 16, 20, 21 and 25, the right and left receiving members 481 and 491 are formed so as to project axially from the end surfaces 77 of the retaining side covers 34 and 35 similarly to right and left inclined members 80 and 81 in a form fitting to the outer surfaces of the hook-shaped supporting parts 22 and 23 of the bearing block body 10. The inner curved surfaces 88 of the vertical walls 521 and 531 on the side of loaded balls are formed symmetrically with respect to the lower curved surfaces 85 of the right and left inclined members 80 and 81. Axial guide grooves 511 are formed in the inverted L-shaped parts 461 and 471 on the side of unloaded balls symmetrically with respect to the grooves for unloaded balls 30 and 31 of the hook-shaped supporting parts 22 and 23. The inside surfaces of bridges 761 connecting the vertical walls 521 and 531 and the inverted L-shaped parts 461 and 471, respectively, are in contact with the inclined bottom walls 43 and 44 of the supporting parts 22 and 23.

In the linear ball bearing unit of the present invention thus constituted, the loaded balls moving between the grooves for loaded balls of the bearing block body 10 and a race bar 86 are guided into the holes for unloaded balls 28 and 29 and into passages formed between the grooves for unloaded balls 30 and 31 of the hook-shaped supporting parts 22 and 23 of the bearing block body 10 and the guide grooves 511 of the right and left receiving members 481 and 491 through U-shaped grooves 70, 71, 74 and 75 for inverting the direction of movement of the balls, respectively.

The guide grooves 511 are formed in the inner surfaces of the receiving members 481 and 491 of a substantially U-shaped cross section symmetrically with respect to the grooves for unloaded balls 30 and 31 of the supporting parts 22 and 23 allowing smoothe movement of the unloaded balls.

Since the members of a U-shaped cross section are made of a material, such as a thermosetting resin, a die cast alloy or a sintered metal, and are integral parts of the retaining side covers, the side plates, a plurality of threaded holes and screws are eliminated, hence the weight of the linear ball bearing unit is reduced and the efficiency of the assembling work is improved. Furthermore, since the upper ends of the inverted L-shaped parts are fitted in the grooves formed in the bearing block body, the deformation of the thermosetting resin parts is corrected, the rigidity of the parts is increased, besides, the dust sealing capability of the linear ball bearing is remarkably improved.

And also, since the bearing block body of the present invention is made of a steel (steel block) by forging, the bearing block body of the present invention is superior to that produced through turning process in respect of the mechanical properties, such as tensile strength and compressive strength, which are improved owing to the effect of forging, the sear resistance and durability.

Still further, the integrated constitution of the retaining side covers made of a thermosetting resin, die cast alloy or sintered metal, contributes to reducing the weight and to improving the efficiency of assembling the linear ball bearing unit, hence, to reducing the cost of the linear ball bearing unit.

And still further, the provision of the slit in the bearing block body 10 allows the application of a preload to the linear ball bearing through fastening a plurality of fastening members, such as bolts or nuts, provided on the side wall of the bearing block body 10, whereby the gaps between the loaded balls and the grooves for loaded balls can be adjusted to provide a precision linear ball bearing unit. Besides, the application of a preload to the linear ball bearing will not result in the differential slipping of the balls, hence the smooth movement of the balls is assured.

Since the balls are retained by the retaining side covers for orderly circulating motion, the balls will not be allowed to fall off even when the bearing block body is separated from the race bar.

It is economically advantageous to form the front retaining side cover and the rear retaining side cover in an identical form, however, the respective forms of those retaining side covers are not necessarily be identical to provide the same function and the effect of the present invention, that is, when one of the retaining side cover is elongated, the other retaining side cover is only to be shortened by a length increased in the former. The retaining pins and the corresponding holes formed at the extremities of the retaining side covers can be easily engaged and disengaged, thus facilitating the work for joining the front and rear retaining side covers.

However, when it is unnecessary to disassemble the linear ball bearing unit, the retaining side covers may be bonded together with a strong adhesive and then, the horizontal members may be made to firmly adhere to the upper wall of the bearing block body.

I claim:
1. A linear ball bearing assembly comprising:
 (a) a linear ball bearing with opposite ends including a bearing block body and retaining covers attached to said opposite ends;
 (b) a race bar of generally X-shaped cross section with ribs, and a central recess of a generally trapezoidal cross section defined in said bearing block body, said central recess having an upper wall, also inclined walls with lower hook-shaped supporting parts, and right and left skirts formed on opposite sides of said central recess, four axial grooves for receiving loaded balls defined in said upper wall and said lower hook-shaped supporting parts of said inclined walls, the radius of curvature of said grooves being substantially the same as the radius of balls which are to be received, also, axial through holes for receiving unloaded balls, defined in parallel to said grooves for receiving loaded balls, said axial holes being so disposed as to also define a junction between said holes and said grooves for receiving loaded balls;
 (c) grooves for receiving unloaded balls defined in the back side surfaces of said lower hook-shaped supporting parts, in parallel to said grooves for receiving loaded balls, also, a junction being defined between said grooves for receiving loaded balls and said grooves for receiving unloaded balls;
 (d) U-shaped grooves for inverting the direction of movement of balls defined in each of said retaining covers at positions corresponding to the junction between the grooves for receiving loaded balls and the holes for receiving unloaded balls and, between the grooves for receiving loaded balls and the grooves for receiving unloaded balls;
 (e) each of said retaining side covers integrally including a horizontal member, right and left inclined members and right and left receiving members which extend on the respective sides of said U-shaped grooves for inverting the direction of movement of the balls;
 (f) grooves providing a path for loaded balls of a radius of curvature substantially the same as the radius of any balls in said path and of a size capable of retaining any such balls defined between said horizontal member, right and left inclined members and right and left receiving members, along the axial direction of said members, said retaining covers being disposed in said bearing block body at the opposite ends thereof and fixed thereto with said horizontal members firmly fastened to the upper wall of said bearing block body, each of said right and left receiving members being formed in a substantially U-shaped cross section with an upper inverted L-shaped part with an upper edge, said upper edge being disposed opposite the groove for receiving unloaded balls and is provided with a guide groove;
 (g) a multiplicity of balls filled in all said grooves and holes defined in said bearing block body and in said retaining covers, said race bar of generally X-shaped cross section being provided with grooves of a radius of curvature substantially the same as the radius of the balls which are to be inserted so as to receive loaded balls in the upper surfaces and in the lower inclined surfaces of the right and left ribs thereof.

2. A linear ball bearing unit according to claim 1, wherein said retaining side covers are made of a synthetic resin.

3. A linear ball bearing unit according to claim 1, wherein said retaining side covers are made of a nonferous metal.

4. A linear ball bearing unit according to claim 1, wherein said retaining side covers are made of a sintered metal.

5. A linear ball bearing unit according to claim 1, wherein means to fix said retaining side covers to said bearing block body is screws or the like.

* * * * *